United States Patent

[11] 3,594,860

| [72] | Inventors | Richard W. Nelson<br>Bothell;<br>Robert F. Mackin, Seattle; Wayne I.<br>Tretsven, Seattle, all of, Wash. |
|---|---|---|
| [21] | Appl. No. | 875,653 |
| [22] | Filed | Nov. 12, 1969 |
| [45] | Patented | July 27, 1971 |
| [73] | Assignee | The United States of America as represented by the Secterary of the Interior |

[54] METHOD FOR SHUCKING AND EVISCERATING BIVALVE MOLLUSKS
5 Claims, 4 Drawing Figs.

| [52] | U.S. Cl. | 17/48, 17/74 |
|---|---|---|
| [51] | Int. Cl. | A22c 29/00 |
| [50] | Field of Search | 17/48, 53, 54, 74 |

[56] References Cited
UNITED STATES PATENTS

| 3,203,034 | 8/1965 | Matzer et al. | 17/74 |
| 3,230,580 | 1/1966 | Marvin et al. | 17/48 |
| 3,239,876 | 3/1966 | Polito | 17/53 |
| 3,320,631 | 5/1967 | Brown | 17/74 |
| 3,473,191 | 10/1969 | Evans | 17/74 |

*Primary Examiner*—Lucie H. Laudenslager
*Attorneys*—Ernest S. Cohen and Albert A. Kashinski ABSTRACT: Bivalve mollusks are mechanically shucked and eviscerated in a continuous, automatic process. A burner severs one half-shell from the bivalve muscle, gaping the shell. The two half-shells are then physically separated and the remaining half-shell, with the muscle and viscera attached, is inverted in a water bath. Water jets strike the flesh, loosening the viscera from the muscle and shell. A suction pump ingests the viscera in a steadily flowing stream of water, thoroughly eviscerating the bivalve. Another burner then severs the muscle from the remaining half-shell.

PATENTED JUL 27 1971 3,594,860

INVENTORS
RICHARD W. NELSON
ROBERT F. MACKIN
WAYNE I. TRETSVEN

BY Ernest S. Cohen

ATTORNEY

METHOD FOR SHUCKING AND EVISCERATING BIVALVE MOLLUSKS

BACKGROUND OF THE INVENTION

Bivalve mollusks have been shucked and eviscerated manually for many years. Apparatus have been constructed in prior attempts to supplant manual processing, but none of these apparatus have been completely successful. This invention is a simple and efficient solution to the need for mechanical bivalve processing.

Before a bivalve mollusk shell can be separated from the flesh within it, the shell must first be severed from the powerful adductor muscle. Experience in the prior art has shown that an application of heat in the local area of muscle attachment is effective to sever the shell and muscle and to open, or gape, the bivalve. This well-known process is performed simply and efficiently with a multitipped oxygen-acetylene burner in this invention.

Prior attempts to mechanically eviscerate bivalve mollusks have involved apparatus characterized by complexity and inefficiency. Bivalves have been eviscerated in whirling centrifugal separators that hurl their viscera from the muscles and shell. In other apparatus whole bivalve flesh has been enclosed in complex eviscerator containers and the viscera drawn from the muscle by water suction acting through a perforated plate. Besides being unduly complex, the perforated container walls restricted water flow past the flesh. Inefficient operation resulted. It is against this background that this invention was made.

SUMMARY OF THE INVENTION

This invention is a method and apparatus for shucking and eviscerating bivalve mollusks, and in particular the bivalve generally known as the scallop. In the process of preparing a scallop for consumption as food, the shell is opened and the adductor and catch muscles, or meat, are separated from the shell and viscera. The shell and viscera are then discarded. When performed manually, the shucking-eviscerating process is tedious and time consuming. Mechanized shucking and eviscerating, however, speed the process to a pace consistent with the growing consumer demand for scallop flesh, reducing labor costs while producing a product of improved cleanliness and structural integrity.

Shucking and eviscerating in the apparatus of this invention are performed in four distinguishable steps—gaping, breaking, eviscerating, and separating. In the first step a scallop in a horizontal position is heated from opposite the attachment area of the adductor and catch muscles on the upper half-shell. A high thermal intensity oxygen-acetylene flame used for this purpose causes muscle separation and gaping in a very short time. Gravitational force draws the scallop flesh away from the horizontal upper half-shell during this heating process until the shell gapes, so that the short flame exposure produces a minimal cooking effect.

After gaping, the second, or breaking step is performed. By physical breakage at the hinge, the upper and lower half-shells are separated from one another. The upper half-shell is discarded. Although more complex structures might be used equivalently for performing this step, it is performed simply and efficiently by conveying the upper half-shell against a rigid shucking-bracket. The shucking-bracket snags the upper half-shell, breaking it free from the lower half-shell as the scallop advances to the third step.

In the third step the scallop is eviscerated by a water suction process. Inverted in a tank of water, the scallop flesh is sprayed with water jets to loosen the viscera from the shell and muscle. The loosened viscera are drawn into a water suction intake and subsequently discarded. Turbulence generated by the incoming and outgoing water streams agitates the muscle with a cleansing action that loosens sand and residue, yet has little effect on the attachment of the muscle and shell.

After evisceration, the fourth step of separating the muscle and lower half-shell is performed. Separation is achieved by heating the scallop shell in the same manner as in the original gaping step. From this general description, it can be seen that a simple and efficient method and apparatus result from the novel arrangement disclosed.

Therefore, one object of this invention is a simple, efficient method for shucking and eviscerating bivalve mollusks, and particularly scallops.

Another object of this invention is a simple, efficient apparatus for shucking and eviscerating bivalve mollusks, and particularly scallops.

A still further object of this invention is a method and apparatus for eviscerating scallops by subjecting their flesh and attached shells to differential water pressures.

These and other objects of this invention will be apparent from the following specification and drawings.

DESCRIPTION OF THE PREFERRED EMBODIMENT

Figure 1:
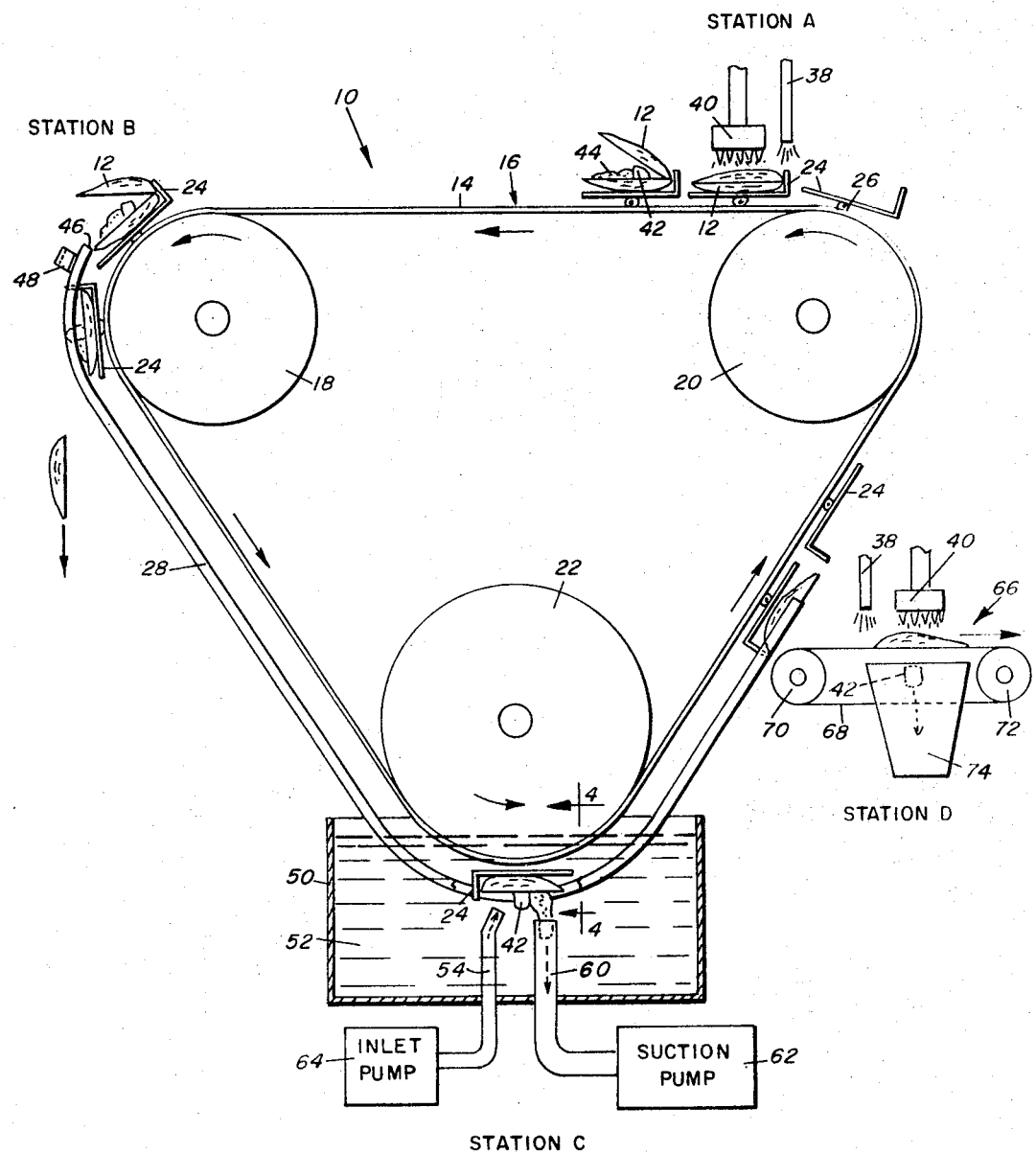
FIG. 1 is a side view of a bivalve mollusk shucking and eviscerating apparatus.

An apparatus 10 for automatic, mechanical separation of edible flesh from the shells and viscera of bivalve mollusks is shown in FIG. 1. While the apparatus 10 is suited for removal of flesh from any species of bivalve, it is particularly suited to the species of bivalve generally known as the scallop. Unlike the flesh of other bivalve mollusks, such as oysters and clams, only the adductor and catch muscles of the scallop are consumed as food. Shucking of oysters and clams requires only the removal of their flesh from within their protective shells. Culinary preference, however, requires the additional step of separating viscera from muscles when a scallop is shucked. This additional step is performed thoroughly and efficiently in combination with a complete shucking process by the structurally simple apparatus shown in FIG. 1.

Four distinguishable steps in the shucking process are performed by the apparatus 10. Beginning at Station–A, a whole, live scallop 12 is loaded onto an individual tray 24 of a continuous conveyor 16. The scallop passes through a very high temperature flame which loosens the adductor and catch muscles 42 from the upper half-shell, causing the scallop shell to pop open, or gape. At Station–B the upper half-shell is physically separated from the lower half-shell. With the muscle still firmly attached, the lower half-shell is inverted as it proceeds to Station–C. At Station–C, the scallop enters a water bath 52 where water jets strike the flesh, loosening the viscera 44 from the adductor and catch muscles. The viscera is then drawn away from the muscles and into a discharge pipe 60 by a hydraulic suction pump 62, leaving only the cleaned muscles and half-shell. Completely eviscerated, the scallop proceeds to Station–D, where the muscles and remaining half-shell are separated.

Scallops 12 are transported between the four Stations A—D of the apparatus 10 on a continuous belt 14 of a closed-loop conveyor 16. The belt 14, forms an inverted triangle with a horizontal base, passing around three wheels 18—22, one at each vertex of the triangle. One wheel 20 is connected to a drive mechanism (not shown) for continuously rotating the belt 14 in a counterclockwise direction, as shown by arrows in FIG. 1. The other two idler wheels rotate freely, conforming the belt to a triangular shape.

On the belt 14 there is a series of open, L-shaped trays 24 for receiving individual scallops 12. The long base leg of each tray 24 is slightly narrower than the belt, and is aligned with the direction of belt travel. Several fasteners 26, spaced across the width of the belt, secure the base leg of the tray to the belt in this orientation, while permitting relative pivotal movement of the belt and tray as they pass over the wheels 18—22. On the rear of each tray, a short leg forms an upright stop, somewhat narrower than the base leg, for guiding a scallop in the direction of belt travel. When the belt 12 is traversing a straight portion of its path, each upright leg closely abuts the end of a succeeding tray, so that both ends of the tray are effectively closed.

Figure 2:
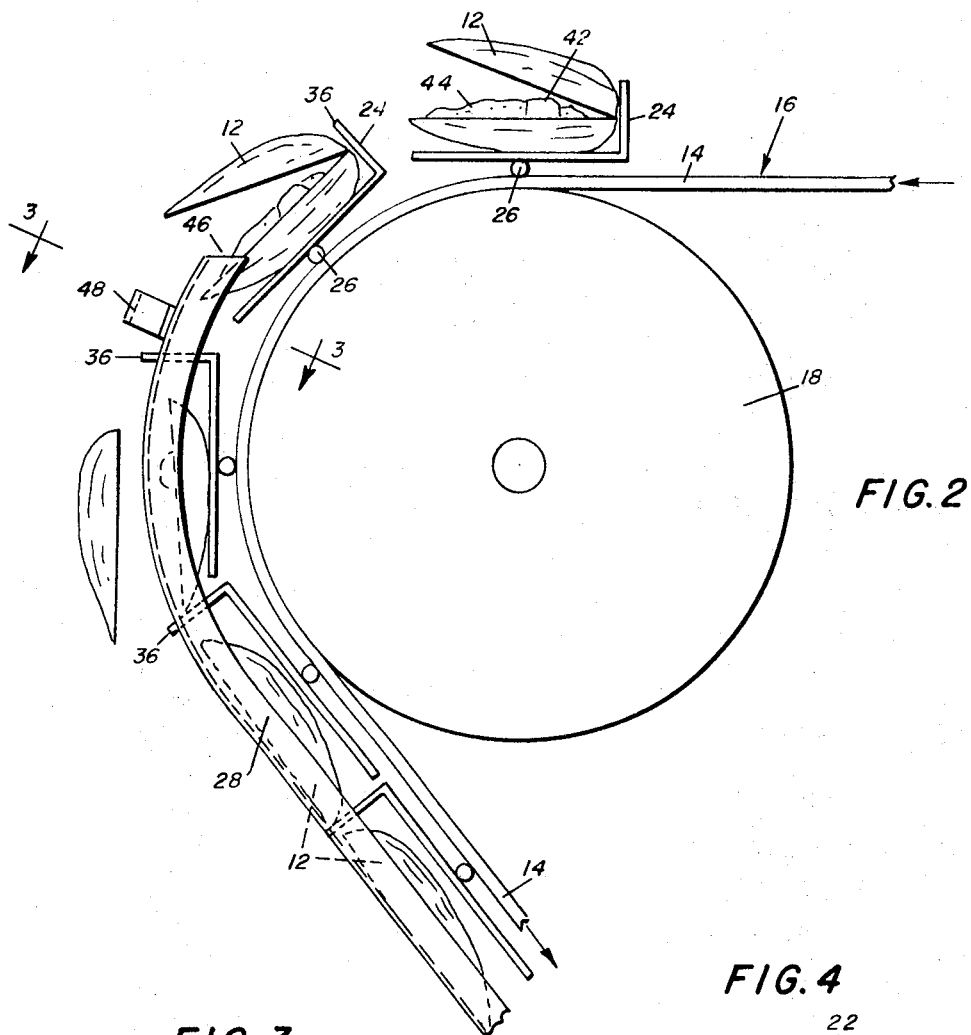
FIG. 2 is an enlarged side view of the portion of the apparatus of FIG. 1 generally indicated as Station-B.
Figure 3:
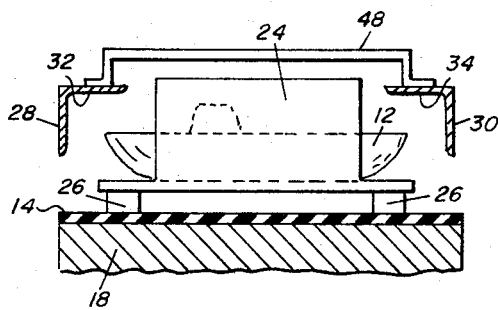
FIG. 3 is a sectional view taken along lines 3–3 in FIGS. 1 and 2.
Figure 4:
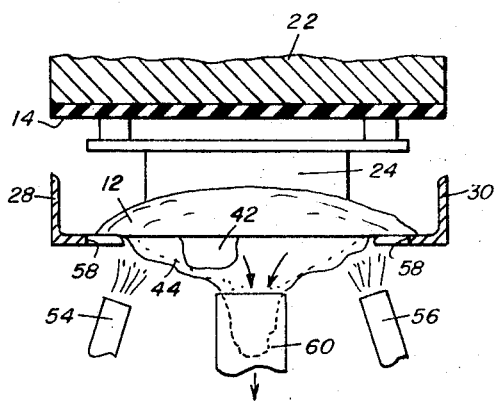
FIG. 4 is a sectional view taken along lines 4–4 in FIG. 1.

As noted above, a scallop 12 leaving Station–B is inverted as it proceeds to Station–C. This inversion is accomplished by turning the scallop supporting tray 24 end-over-end. Support for the scallop in its inverted position is provided by a spaced, parallel pair of right-angle channels 28 and 30, which are spaced outward from, and aligned with, the opposite edges of the conveyor belt 14, as best seen in FIGS. 2 and 3. The channels 28 and 30 extend from the vertex of the belt 14 adjacent to wheel 18, and around the wheel 22, terminating adjacent to Station–D. The interior channel angles face one another and also face the belt 14, forming an interior track around the periphery of the belt. Scallops in inverted position lie on the inner, coplanar channel walls 32 and 34 as they are advance to and form Station–C.

The reason for placing the adjacent trays 24 in close proximity to one another on the belt 14 is apparent in the operation depicted in FIG. 2. When a scallop and tray are inverted, gravitational forces tend to slide the scallop off of the tray; and in completely inverted position the base leg of the tray does not support the scallop at all. By replacing the upright leg of each tray in close proximity to the succeeding tray, the rear face 36 of the upright leg acts as a support for a succeeding scallop. In aid of this operation, the upright leg of each tray 24 extends beyond the plane of the channel walls 32 and 34 for all relative positions of the channels and tray. Because use of the apparatus 10 is contemplated for various size mollusks, the spacing between the channels 28 and 30 is adjustable by moving them relative to one another and to their supporting structure (not shown).

The individual shucking and eviscerating steps performed at Stations A—D will now be described in detail. At Station–A the upper half-shell of the scallop is severed from the adductor and catch muscles 42 by a high temperature flame. Prior to entering the heating area of Station–A, a scallop is manually or mechanically placed in an individual tray 24 and the scallop and conveyor are then bathed with a stream of cooling water from a nozzle 38. This cooling water protects the conveyor structure from the intense heat generated in the shell removal process. As the scallop 12 advances, it passes under a water-cooled burner 40, fed with a supply of oxygen and acetylene (not shown) and ignited to provide an intense flame. The burner is positioned directly over the attachment location of the adductor and catch muscles on the scallop half-shell, so that the flame impinges on the most effective area of the shell. Preferrably, the burner has an array of flame-directing tips which produce an even temperature over a wide area. Even temperature is necessary because separation of the shell and muscles depends upon even, thorough heating of the shell area over and adjacent to the muscle attachment. Because the scallop lies flat in a horizontal plane during this heating process, the flesh within the shell is drawn by gravity away from the upper half-shell; and there is less likelihood of cooking than might occur with any other orientation of the scallop.

Heating of the scallop shell with an oxygen acetylene flame at a temperature in the range of 5,800°—6,000° F (ratio of oxygen to acetylene between 1.10 and 1.70 to 1) for a period of approximately 1 second is generally sufficient to sever the muscles from the half-shell, after which the scallop pops open, or gapes, exposing the muscles 42 and viscera 44. Once the adductor and catch muscles are severed from the half-shell, gaping occurs as a natural phenomenon. It is caused by a resilient ligament compressed between the half-shells when they are closed. When the muscles are severed, the ligament spreads the half-shells apart, pivoting the shells about a hingelike membrane which joins the shell at one end. To prepare the scallop for the next step in the shucking process it is necessary that the hingelike portion face the upright leg of the tray 24 and that the open end of the gaped scallop face in the direction of conveyor travel. This orientation is easily achieved in the initial process of loading the conveyor 16.

After gaping, the scallop proceeds to Station–B where the upper and lower half-shells are separated by breaking them apart. As the scallop travels along the conveyor 16 it encounters one end 46 of the pair of right angle channels 28 and 30. The channels are spaced from the belt 14 and trays 24, and from each other, a distance sufficient to permit the lower half-shell, muscle and viscera to pass beneath or between them at this end. The channels are spaced close enough, however, to cause the upper half-shell to strike them, forcing the shell to open wider than before. In this opened position the upper half-shell strikes a U-shaped shucking-bracket 48 bridging between the channels 28 and 30 at a distance from the trays sufficient to permit the remainder of the scallop to pass beneath. While the lower half-shell is restrained by the channels 28 and 30 and by the tray 24, the conveyor drives the upper half-shell against the shucking-bracket 48, breaking it from the lower half-shell. Alternately, equivalent shell separation mechanisms of the prior art might be used for this process. In turn, the upper half-shell falls to a waste receptacle where it is discarded. The remainder of the scallop then proceeds in inverted position along the channels to Station–C.

At Station–C, evisceration of the scallop is performed by a water suction process. Adjacent to the conveyor wheel 22 the inverted scallop enters a tank 50 and is submerged in a water bath 52. Jets of water from inclined nozzles 54 and 56 strike the exposed portion of the scallop between the spaced channels, loosening the viscera from the shell without loosening the muscle. To prevent interference with the water jets, notches 58 are cut in the channels 28 and 30 adjacent to the nozzles, enabling the water to strike the shell with full force. The scallop then passes over a water suction-intake 60 located a short distance from the exposed muscle end. As the scallop passes, the viscera are drawn into the intake by differential water pressure and are torn away from the shell and muscle. The viscera then enter the suction pump system 62 for discharge into a waste receptacle (not shown).

An open inpeller-type water pump 62 is suitable for removing viscera from a scallop in this way. A low-pressure high-volume pump with a capacity of approximately 230 g.p.m. at 15 feet of head has proven effective for this purpose then driven by a 2 horsepower motor. Water is supplied to the inlet jets 54 and 56 by a high-pressure low-volume pump 64 adjusted to equal the removal rate of the outlet pump. In addition, the inlet pump supplies a steady stream of cooling water to the nozzle 38 preceding the shell separation burners 40.

Continuous replacement of the water 52 in the tanks 50 provides thorough washing of the muscle 42 throughout evisceration. Unlike a gaseous vacuum, which is effective only locally, the turbulence generated by the incoming and outgoing water streams is effective over a wide area of the scallop and yields a significantly improved result. Aboard a vessel, sea water is used as a water supply. For shucking operations ashore, the outgoing water can be filtered and continuously recirculated.

After evisceration, the scallop is lifted out of the water bath and raised to Station–D where it is transferred in an inverted position from the conveyor 16 to a second conveyor 66. An endless belt 68 on the second conveyor travels in a horizontal plane between a spaced pair of clockwise-rotating drive and idler wheels 70 and 72, carrying the scallop beneath a second water jet 38 and burner 40 for severing the muscle from the remaining half-shell in the manner previously described. Open spaces in the belt 68 allow the muscle to fall into a chute 74 for further processing. Alternately, a mechanical scraper, conforming to the shape of the concave shell can be used to aid this final separation of the muscle and shell.

Although the individual steps in the shucking-eviscerating process performed by the apparatus 10 have been independently described, each step is performed simultaneously with the others on a series of scallops in continuous succession. While the order in which the individual shucking and eviscerating steps are performed by the apparatus 10 most efficiently mechanizes the method of this invention, other arrangements are possible within the scope of this invention. For example, evisceration might be performed after gaping, but before the muscle is severed from either half-shell; or the eviscerating step might be performed with one half-shell separated from the muscle, although attached to the other half-shell. To these ends, substitution of equivalent elements for the exemplary structure of the apparatus described will be apparent to those of ordinary skill in the art, and the scope of the invention should be limited only by the scope of the following claims.

What we claim is:

1. A method of shucking and eviscerating a bivalve mollusk comprising the steps of:
    opening the bivalve shell to expose the muscle and viscera inside, while preserving at least part of the natural attachment between the muscle and shell,
    immersing the bivalve in a liquid bath so that the liquid contacts the muscle and viscera of the bivalve,
    restraining the bivalve shell in the liquid bath to limit movement of the bivalve within the bath,
    generating suction forces within the liquid bath at an area adjacent to the muscle and viscera of the bivalve by drawing a stream of liquid away from contact with the muscle and viscera, the suction forces being sufficiently strong to draw away and separate the viscera from the muscle and shell, yet insufficient to separate the muscle from the shell, and
    separating the muscle from the shell after the viscera has been separated from the muscle and shell by the suction forces.

2. A method for shucking and eviscerating a bivalve mollusk as claimed in claim 1 in which the step of opening further comprises:
    intensely heating one half-shell of the bivalve in the area directly opposite the attachment location of the muscle and the one half-shell, for a duration sufficient to cause separation of the muscle from the one half-shell, and subsequent gaping of the bivalve, and
    physically separating the one half-shell from the remainder of the bivalve; and
    the step of separating the muscle after the viscera has been separated comprises:
    intensely heating the other half-shell of the bivalve in the area directly opposite the attachment location of the muscle and the other half-shell, for a duration sufficient to cause separation of the muscle from the other half-shell.

3. A method for shucking and eviscerating a bivalve mollusk as claimed in claim 1 including the additional step of:
    propelling a high velocity stream of liquid toward the muscle and viscera of the bivalve to loosen the muscle and viscera from the shell before the step of generating suction forces is performed.

4. A method for shucking and eviscerating a bivalve mollusk as claimed in claim 2 including the additional step of:
    propelling a high velocity stream of liquid toward the muscle and viscera of the bivalve to loosen the muscle and viscera from the shell before the step of generating suction forces is performed.

5. A method for shucking and eviscerating a scallop comprising the steps of:
    positioning the scallop so that one half-shell lies substantially flat against a horizontal supporting surface and intensely heating the other half-shell in the area directly opposite the attachment location of the muscle and the other half-shell to cause separation of the muscle from the other half-shell, and subsequent gaping of the scallop,
    physically separating the two half-shells of the scallop,
    restraining the one half-shell and attached muscle and viscera in inverted position in a water bath by limiting the movement of the one half-shell,
    propelling a high velocity stream of water toward the scallop to loosen the viscera from the muscle and shell,
    sucking a stream of water away from contact with the muscle and viscera to draw away and separate the viscera from the muscle and shell, and
    intensely heating the one half-shell in the area directly opposite the attachment location of the muscle and the one half-shell to separate the muscle from the one half-shell.